United States Patent
Kiyohara et al.

(10) Patent No.: US 7,643,176 B2
(45) Date of Patent: Jan. 5, 2010

(54) METHOD AND APPARATUS CONTROLLING PRINTED COLOR TONE CONDITIONALLY USING A REPRESENTATIVE POINT OR ALTERNATIVE REPRESENTATIVE POINT

(75) Inventors: Satoru Kiyohara, Kyoto (JP); Kazuki Fukui, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 518 days.

(21) Appl. No.: 11/715,409

(22) Filed: Mar. 8, 2007

(65) Prior Publication Data

US 2007/0211273 A1    Sep. 13, 2007

(30) Foreign Application Priority Data

Mar. 9, 2006    (JP) ............................. 2006-063804

(51) Int. Cl.
*H04N 1/50* (2006.01)
*B41F 3/42* (2006.01)
*B41M 1/14* (2006.01)

(52) U.S. Cl. ....................... 358/1.9; 358/3.24; 358/504; 358/521; 101/171; 101/211; 101/365; 101/484

(58) Field of Classification Search .................. 358/1.9, 358/3.24, 504, 521, 540; 382/112; 399/49, 399/72, 14, 15; 347/6, 14, 15, 19, 115, 116; 101/365, 484, 171, 211
See application file for complete search history.

(56) References Cited

U.S. PATENT DOCUMENTS

| | | | | |
|---|---|---|---|---|
| 6,698,355 B2 * | 3/2004 | Fukui | ........................... | 101/365 |
| 6,968,784 B2 * | 11/2005 | Kiyohara | ..................... | 101/484 |
| 7,206,097 B2 * | 4/2007 | Takeda et al. | ................. | 358/1.9 |
| 7,216,946 B2 * | 5/2007 | Yamamoto et al. | ............. | 347/6 |
| 2004/0012801 A1 | 1/2004 | Murakami | | |
| 2004/0237823 A1 | 12/2004 | Kiyohara | | |
| 2005/0225786 A1 * | 10/2005 | Kiyohara | ..................... | 358/1.9 |
| 2005/0264835 A1 * | 12/2005 | Okita et al. | ................... | 358/1.9 |
| 2006/0055948 A1 * | 3/2006 | Ozaki et al. | ................... | 358/1.9 |
| 2009/0002767 A1 * | 1/2009 | Ozaki et al. | ................. | 358/3.06 |

FOREIGN PATENT DOCUMENTS

EP    1 382 448 A1    1/2004

(Continued)

OTHER PUBLICATIONS

European Search Report issued in corresponding European Patent Application No. 07004160.3-1522, dated on Jun. 18, 2007.

*Primary Examiner*—Scott A Rogers
(74) *Attorney, Agent, or Firm*—McDermott Will & Emery LLP

(57) ABSTRACT

A printed tone control method for adjusting a printed color tone by comparing image data serving as a reference and image data obtained by reading an image from a print actually made by a printing machine. The method includes a representative point setting step for setting a representative point for use in control of the color tone based on image data, an alternative representative point setting step for setting an alternative representative point that satisfies a predetermined condition when a point inappropriate for tone measurement is selected as the representative point, and a tone adjusting step for adjusting the color tone by using the alternative representative point.

9 Claims, 20 Drawing Sheets

FOREIGN PATENT DOCUMENTS

| | | |
|---|---|---|
| EP | 1 385 330 A2 | 1/2004 |
| EP | 1 486 919 A2 | 12/2004 |
| EP | 1 586 449 A1 | 10/2005 |
| EP | 1 385 330 A3 | 2/2007 |
| GB | 2 140 353 A | 11/1984 |
| JP | 2004-50609 | 2/2004 |
| JP | 2004-351814 | 12/2004 |

* cited by examiner

Fig.9A

| C \ M | 4 | 16 | 34 | 54 | 76 | 92 | 100 |
|---|---|---|---|---|---|---|---|
| 4 | ▲ | ▲ | ○ | ○ | × | × | × |
| 16 | ▲ | ○ | ○ | ○ | ○ | ○ | ▲ |
| 35 | ▲ | ○ | ○ | ○ | ○ | ○ | ○ |
| 53 | ▲ | ▲ | ○ | ○ | ○ | ○ | ○ |
| 76 | ▲ | ▲ | ○ | ○ | ○ | ○ | ○ |
| 90 | ○ | ○ | ▲ | ○ | ○ | ○ | ▲ |
| 100 | ○ | ○ | ○ | ○ | ○ | ○ | ○ |

Fig.9B

| C \ M | 4 | 16 | 34 | 54 | 76 | 92 | 100 |
|---|---|---|---|---|---|---|---|
| 4 | ▲ | ○ | ○ | ○ | ○ | ○ | ○ |
| 16 | ▲ | ○ | ○ | ○ | ○ | ○ | ○ |
| 35 | ▲ | ○ | ○ | ○ | ○ | ○ | ○ |
| 53 | × | ○ | ○ | ○ | ○ | ○ | ○ |
| 76 | × | ○ | ○ | ○ | ○ | ○ | ○ |
| 90 | × | ▲ | ○ | ○ | ○ | ○ | ▲ |
| 100 | × | ○ | ○ | ○ | ○ | ○ | ▲ |

Fig.10A

| C \ Y | 10 | 35 | 64 | 100 |
|---|---|---|---|---|
| 4 | ▲ | ▲ | ▲ | ▲ |
| 16 | ○ | ○ | ○ | ○ |
| 35 | ○ | ○ | ○ | ▲ |
| 53 | ▲ | ○ | ▲ | × |
| 76 | × | ▲ | × | × |
| 90 | ▲ | ○ | ▲ | × |
| 100 | ○ | ○ | ○ | ○ |

Fig.10B

| C \ Y | 10 | 35 | 64 | 100 |
|---|---|---|---|---|
| 4 | ○ | ○ | ○ | ○ |
| 16 | ○ | ○ | ○ | ○ |
| 35 | ○ | ○ | ○ | ○ |
| 53 | ▲ | ○ | ○ | ○ |
| 76 | ▲ | ○ | ○ | ○ |
| 90 | ▲ | ○ | ○ | ○ |
| 100 | ▲ | ○ | ○ | ○ |

Fig.11A

| M\Y | 10 | 35 | 64 | 100 |
|---|---|---|---|---|
| 4 | ○ | ▲ | ▲ | × |
| 16 | ○ | ○ | ○ | ○ |
| 35 | ○ | ○ | ○ | ○ |
| 53 | ○ | ○ | ▲ | ○ |
| 76 | ○ | ○ | ▲ | ○ |
| 90 | × | × | × | × |
| 100 | ○ | ▲ | ▲ | ▲ |

Fig.11B

| M\Y | 10 | 35 | 64 | 100 |
|---|---|---|---|---|
| 4 | ○ | ○ | ○ | ○ |
| 16 | ○ | ○ | ○ | ○ |
| 35 | ○ | ○ | ○ | ○ |
| 53 | ▲ | ○ | ○ | ○ |
| 76 | × | ○ | ○ | ○ |
| 90 | × | ▲ | ▲ | ○ |
| 100 | × | ○ | ○ | ○ |

| Y \ M | 4 | 16 | 34 | 54 | 76 | 92 | 100 |
|---|---|---|---|---|---|---|---|
| 10 | ▲ | ▲ | ▲ | × | × | × | × |
| 35 | ○ | ▲ | × | ▲ | × | ▲ | ▲ |
| 64 | ○ | ▲ | ▲ | × | × | × | ▲ |
| 100 | ▲ | ▲ | ▲ | ▲ | ▲ | × | × |

| Y \ M | 4 | 16 | 34 | 54 | 76 | 92 | 100 |
|---|---|---|---|---|---|---|---|
| 10 | ○ | ○ | ○ | ○ | ○ | ○ | ○ |
| 35 | ▲ | ○ | ○ | ○ | ○ | ▲ | ▲ |
| 64 | ▲ | ▲ | ▲ | ▲ | ▲ | × | ▲ |
| 100 | ○ | ○ | ○ | ○ | ○ | ▲ | ▲ |

| Y \ M | 4 | 16 | 34 | 54 | 76 | 92 | 100 |
|---|---|---|---|---|---|---|---|
| 10 | ○ | ○ | ○ | × | × | × | × |
| 35 | ○ | ○ | ○ | ○ | ○ | ○ | ○ |
| 64 | ○ | ▲ | ○ | ○ | ○ | ▲ | ○ |
| 100 | ○ | ○ | ○ | ○ | ○ | ○ | ○ |

| Y \ M | 4 | 16 | 34 | 54 | 76 | 92 | 100 |
|---|---|---|---|---|---|---|---|
| 10 | ○ | ○ | ○ | ○ | ○ | ▲ | ▲ |
| 35 | ○ | ○ | ○ | ○ | ○ | ○ | ○ |
| 64 | ○ | ○ | ○ | ○ | ○ | ○ | ○ |
| 100 | ○ | ▲ | ○ | ○ | ○ | ○ | ○ |

| Y \ M | 4 | 16 | 34 | 54 | 76 | 92 | 100 |
|---|---|---|---|---|---|---|---|
| 10 | ▲ | ○ | ▲ | ○ | ○ | ○ | ○ |
| 35 | ▲ | ○ | ○ | ○ | ○ | ○ | ▲ |
| 64 | ▲ | ▲ | ▲ | ▲ | ▲ | ○ | ▲ |
| 100 | ▲ | ○ | ○ | ○ | ○ | ○ | ▲ |

| Y \ M | 4 | 16 | 34 | 54 | 76 | 92 | 100 |
|---|---|---|---|---|---|---|---|
| 10 | ○ | ○ | ▲ | ▲ | × | × | × |
| 35 | ○ | ○ | ○ | ○ | ○ | ○ | ○ |
| 64 | ○ | ○ | ○ | ○ | ○ | ○ | ○ |
| 100 | ○ | ○ | ○ | ○ | ○ | ○ | ○ |

| Y \ M | 4 | 16 | 34 | 54 | 76 | 92 | 100 |
|---|---|---|---|---|---|---|---|
| 10 | ○ | ○ | ○ | ○ | ○ | ○ | ○ |
| 35 | ○ | ○ | ○ | ○ | ○ | ○ | ○ |
| 64 | ○ | ○ | ○ | ○ | ○ | ○ | ○ |
| 100 | ▲ | ○ | ○ | ○ | ○ | ○ | ○ |

| Y \ M | 4 | 16 | 34 | 54 | 76 | 92 | 100 |
|---|---|---|---|---|---|---|---|
| 10 | × | ○ | ○ | ○ | ○ | ○ | ○ |
| 35 | × | ○ | ○ | ○ | ○ | ○ | ▲ |
| 64 | ▲ | ▲ | ▲ | ▲ | ▲ | ○ | ▲ |
| 100 | × | ○ | ○ | ○ | ○ | ○ | ▲ |

| Y \ M | 4 | 16 | 34 | 54 | 76 | 92 | 100 |
|---|---|---|---|---|---|---|---|
| 10 | ○ | ○ | ○ | ▲ | × | × | × |
| 35 | ○ | ○ | ○ | ○ | ○ | ○ | ○ |
| 64 | ▲ | ▲ | ▲ | ○ | ○ | ○ | ○ |
| 100 | ○ | ○ | ○ | ○ | ○ | ○ | ○ |

| Y \ M | 4 | 16 | 34 | 54 | 76 | 92 | 100 |
|---|---|---|---|---|---|---|---|
| 10 | ▲ | ▲ | ▲ | ○ | ○ | ○ | ○ |
| 35 | ○ | ○ | ○ | ○ | ○ | ○ | ○ |
| 64 | ▲ | ▲ | ▲ | ○ | ○ | ○ | ○ |
| 100 | × | ▲ | ○ | ○ | ○ | ○ | ○ |

| Y \ M | 4 | 16 | 34 | 54 | 76 | 92 | 100 |
|---|---|---|---|---|---|---|---|
| 10 | × | ○ | ○ | ○ | ○ | ○ | ▲ |
| 35 | × | ○ | ○ | ○ | ○ | ○ | ○ |
| 64 | × | ▲ | ▲ | ▲ | ▲ | ○ | ▲ |
| 100 | × | ○ | ○ | ○ | ▲ | ○ | ▲ |

| Y \ M | 4 | 16 | 34 | 54 | 76 | 92 | 100 |
|---|---|---|---|---|---|---|---|
| 10 | × | ○ | ▲ | ▲ | × | × | × |
| 35 | ○ | ○ | ○ | ○ | ○ | ○ | ▲ |
| 64 | ○ | ▲ | ○ | ○ | ○ | ○ | ○ |
| 100 | ○ | ○ | ○ | ○ | ○ | ○ | ○ |

| Y \ M | 4 | 16 | 34 | 54 | 76 | 92 | 100 |
|---|---|---|---|---|---|---|---|
| 10 | ▲ | ▲ | ▲ | ▲ | ○ | ○ | ▲ |
| 35 | ▲ | ○ | ○ | ○ | ○ | ○ | ○ |
| 64 | ▲ | ▲ | ▲ | ○ | ○ | ○ | ○ |
| 100 | × | ▲ | ○ | ○ | ○ | ○ | ○ |

| Y \ M | 4 | 16 | 34 | 54 | 76 | 92 | 100 |
|---|---|---|---|---|---|---|---|
| 10 | × | ▲ | ○ | ▲ | ○ | ○ | ▲ |
| 35 | × | ▲ | ○ | ○ | ○ | ○ | ▲ |
| 64 | × | ▲ | ▲ | ▲ | ▲ | ○ | ▲ |
| 100 | × | ▲ | ○ | ○ | ○ | ○ | ▲ |

| Y \ M | 4 | 16 | 34 | 54 | 76 | 92 | 100 |
|---|---|---|---|---|---|---|---|
| 10 | ▲ | ▲ | ▲ | × | × | × | × |
| 35 | ○ | ○ | ○ | ○ | ○ | ▲ | ○ |
| 64 | ○ | ○ | ○ | ▲ | ○ | ○ | ○ |
| 100 | ○ | ○ | ○ | ○ | ○ | ○ | ○ |

| Y \ M | 4 | 16 | 34 | 54 | 76 | 92 | 100 |
|---|---|---|---|---|---|---|---|
| 10 | ▲ | ○ | ○ | ○ | ○ | ○ | ○ |
| 35 | ▲ | ○ | ▲ | ○ | ○ | ○ | ○ |
| 64 | ▲ | ▲ | ▲ | ▲ | ▲ | ▲ | ▲ |
| 100 | ▲ | ○ | ○ | ○ | ○ | ○ | ▲ |

| Y \ M | 4 | 16 | 34 | 54 | 76 | 92 | 100 |
|---|---|---|---|---|---|---|---|
| 10 | × | × | ▲ | ○ | ○ | ○ | ▲ |
| 35 | × | × | ○ | ○ | ○ | ○ | ▲ |
| 64 | × | ○ | ▲ | ▲ | ▲ | ○ | ▲ |
| 100 | × | ▲ | ○ | ▲ | ▲ | ▲ | ▲ |

| Y \ M | 4 | 16 | 34 | 54 | 76 | 92 | 100 |
|---|---|---|---|---|---|---|---|
| 10 | × | × | ▲ | × | × | × | × |
| 35 | ○ | ○ | ○ | ○ | ○ | ▲ | ▲ |
| 64 | ○ | ○ | ▲ | ▲ | ○ | ○ | ○ |
| 100 | ○ | ○ | ○ | ○ | ○ | ○ | ○ |

| Y \ M | 4 | 16 | 34 | 54 | 76 | 92 | 100 |
|---|---|---|---|---|---|---|---|
| 10 | ○ | ○ | ○ | ○ | ○ | ○ | ○ |
| 35 | ○ | ○ | ○ | ○ | ○ | ○ | ○ |
| 64 | ○ | ○ | ○ | ○ | ○ | ○ | ○ |
| 100 | ○ | ○ | ○ | ○ | ○ | ○ | ○ |

| Y \ M | 4 | 16 | 34 | 54 | 76 | 92 | 100 |
|---|---|---|---|---|---|---|---|
| 10 | × | ▲ | ▲ | ○ | ○ | ○ | ▲ |
| 35 | × | ▲ | ○ | ○ | ○ | ○ | ▲ |
| 64 | × | ▲ | ▲ | ▲ | ▲ | ○ | ▲ |
| 100 | × | ○ | ○ | ○ | ▲ | ○ | ▲ |

| Y \ M | 4 | 16 | 34 | 54 | 76 | 92 | 100 |
|---|---|---|---|---|---|---|---|
| 10 | × | × | × | ▲ | × | × | ▲ |
| 35 | ▲ | ▲ | ○ | ▲ | ○ | ○ | ○ |
| 64 | ○ | ▲ | ▲ | ○ | ○ | ○ | ○ |
| 100 | ○ | ○ | ○ | ○ | ○ | ○ | ○ |

METHOD AND APPARATUS CONTROLLING PRINTED COLOR TONE CONDITIONALLY USING A REPRESENTATIVE POINT OR ALTERNATIVE REPRESENTATIVE POINT

BACKGROUND OF THE INVENTION

1. Field of the Invention

This invention relates to a printed tone control method and a representative point determining apparatus for use in controlling ink feeding rates of a printing machine.

2. Description of the Related Art

In order to perform proper printing with a printing machine, it is necessary to control ink feeding rates properly. For controlling the ink feeding rates, it has been conventional practice to measure densities of control strips with a densitometer and determine from density data whether the ink feeding rates are proper or not. However, the density data from the control strips alone is not necessarily sufficient for attaining a proper color tone and the like for a picture area.

For this reason, a print quality measuring apparatus is used which provides control data for controlling the ink feeding rates of a printing machine. The control data is produced by comparing an image on reference paper and an image on an actual print.

The reference paper is also called proof paper, and serves as a reference indicating a color tone of finished prints to obtain proper prints. Printing paper actually printed is also called sampling paper which is extracted by the operator from a discharge station of a printing machine at certain intervals during a printing operation. The printing is considered proper when the color tone on the sampling paper substantially coincides with the color tone on the reference paper.

It has become conventional in recent years to include a print quality measuring apparatus in a printing machine. This construction enables tone control to be carried out in parallel with a printing operation without requiring the operator to extract sample prints.

Where such a print quality measuring apparatus is used, it is difficult to attain an agreement in color tone and the like in all areas between the image on the reference paper and the image on the actual print. For this reason, use is made of a representative point having a color that characterizes a picture on the print, as disclosed in Japanese Unexamined Patent Publications Nos. 2004-50609 and 2004-351814. The representative point is used in order to perform color control of the image, and is set to the image automatically by the apparatus or by the operator.

Although the representative point set in this way has a color that characterizes the picture on the print, this point is not necessarily suitable for color measurement. In time of color measurement, the inks of Y (yellow), M (magenta), C (cyan) and K (black) are measured by R (red), G (green) and B (blue). It is therefore difficult to separate accurately the colors of a point including a large quantity of black ink. It is also difficult to effect accurate color tone control, depending on an overlap of a plurality of colors and a dot percentage.

SUMMARY OF THE INVENTION

The object of this invention, therefore, is to provide a printed tone control method and a representative point determining apparatus for determining a representative point suitable for color measurement to enable accurate tone control.

The above object is fulfilled, according to this invention, by a printed tone control method for adjusting a printed color tone by comparing image data serving as a reference and image data obtained by reading an image from a print actually made by a printing machine, the method comprising a representative point setting step for setting a representative point for use in control of the color tone based on image data; an alternative representative point setting step for setting an alternative representative point that satisfies a predetermined condition when a point inappropriate for tone measurement is selected as the representative point; and a tone adjusting step for adjusting the color tone by using the alternative representative point.

With this printed tone control method, a representative point suitable for color measurement is determined to enable printed tone control with increased accuracy.

In another aspect of the invention, a representative point determining apparatus is provided for setting a representative point for use in printed tone control for adjusting a printed color tone by comparing image data serving as a reference and image data obtained by reading an image from a print actually made by a printing machine, the apparatus comprising a representative point setting device for setting a representative point for use in control of the color tone based on image data; a checking device for checking whether the representative point set by the representative point setting device is appropriate for the control of the color tone; and an alternative representative point setting device for setting an alternative representative point based on predetermined priority conditions when a point inappropriate for tone measurement is selected as the representative point.

Other features and advantages of the invention will be apparent from the following detailed description of the embodiments of the invention.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

FIG. 9A is a table showing measurement errors in time of two color inks applied one over the other;

FIG. 9B is a table showing measurement errors in time of two color inks applied one over the other;

FIG. 10A is a table showing measurement errors in time of two color inks applied one over the other;

FIG. 10B is a table showing measurement errors in time of two color inks applied one over the other;

FIG. 11A is a table showing measurement errors in time of two color inks applied one over the other;

FIG. 11B is a table showing measurement errors in time of two color inks applied one over the other;

FIG. 12A is a table showing measurement errors in time of three color inks applied one over another;

FIG. 12B is a table showing measurement errors in time of the three color inks applied one over another;

FIG. 12C is a table showing measurement errors in time of the three color inks applied one over another;

FIG. 13A is a table showing measurement errors in time of the three color inks applied one over another;

FIG. 13B is a table showing measurement errors in time of the three color inks applied one over another;

FIG. 13C is a table showing measurement errors in time of the three color inks applied one over another;

FIG. 14A is a table showing measurement errors in time of the three color inks applied one over another;

FIG. 14B is a table showing measurement errors in time of the three color inks applied one over another;

FIG. 14C is a table showing measurement errors in time of the three color inks applied one over another;

FIG. 15A is a table showing measurement errors in time of the three color inks applied one over another;

FIG. 15B is a table showing measurement errors in time of the three color inks applied one over another;

FIG. 15C is a table showing measurement errors in time of the three color inks applied one over another;

FIG. 16A is a table showing measurement errors in time of the three color inks applied one over another;

FIG. 16B is a table showing measurement errors in time of the three color inks applied one over another;

FIG. 16C is a table showing measurement errors in time of the three color inks applied one over another;

FIG. 17A is a table showing measurement errors in time of the three color inks applied one over another;

FIG. 17B is a table showing measurement errors in time of the three color inks applied one over another;

FIG. 17C is a table showing measurement errors in time of the three color inks applied one over another;

FIG. 18A is a table showing measurement errors in time of the three color inks applied one over another;

FIG. 18B is a table showing measurement errors in time of the three color inks applied one over another;

FIG. 18C is a table showing measurement errors in time of the three color inks applied one over another;

DESCRIPTION OF THE PREFERRED EMBODIMENTS

Figure 1:
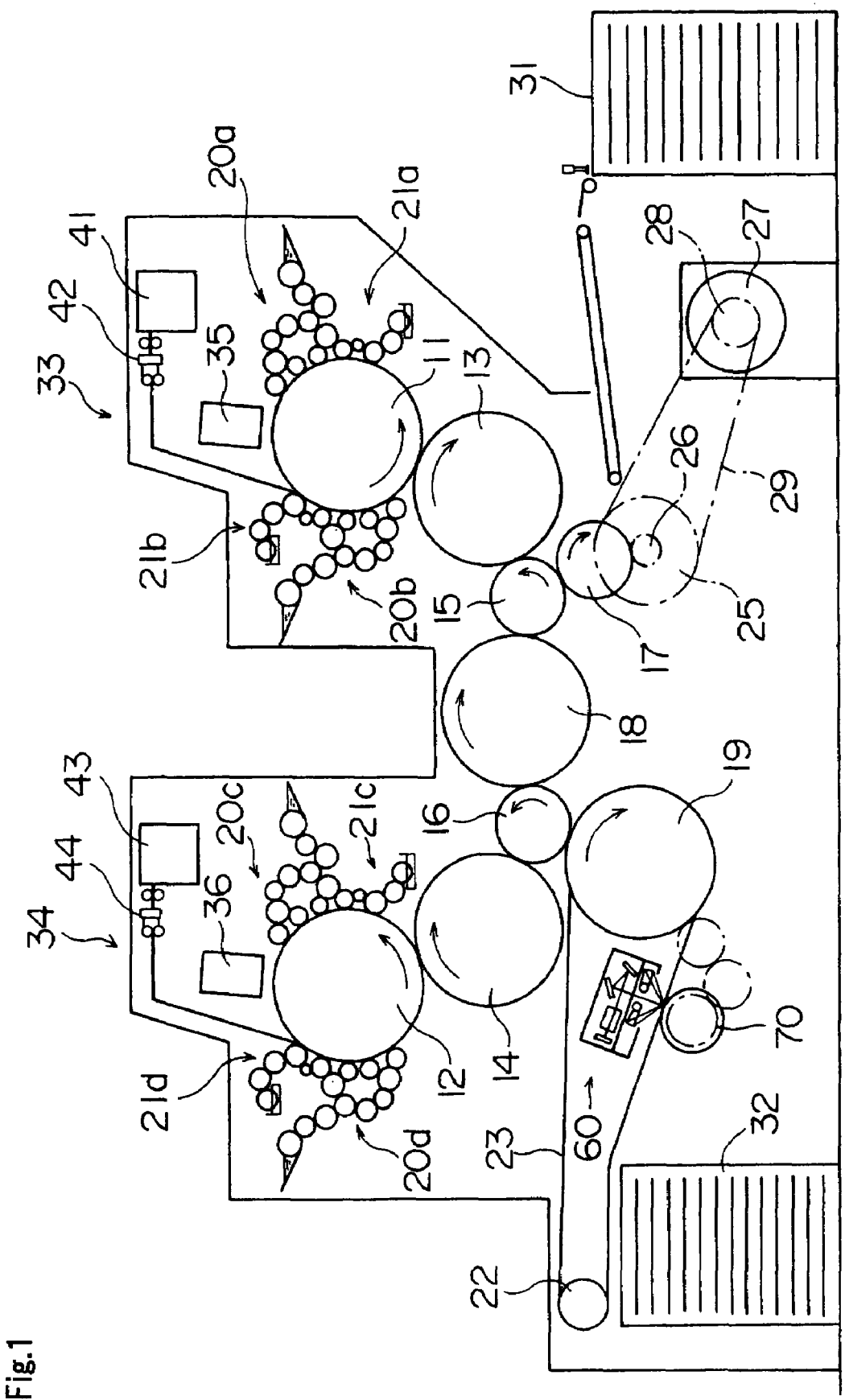
FIG. 1 is a schematic view of a printing machine to which the invention is applied.

An embodiment of this invention will be described hereinafter with reference to the drawings. The construction of a printing machine to which the printed tone control method according to the invention is applied will be described first. FIG. 1 is a schematic view of the printing machine to which the invention is applied.

This printing machine records images on blank plates mounted on first and second plate cylinders 11 and 12 in a prepress process, feeds inks to the plates having the images recorded thereon, and transfers the inks from the plates through first and second blanket cylinders 13 and 14 to printing paper held on first and second impression cylinders 15 and 16, thereby printing the images in four colors on the printing paper.

The printing machine has the first plate cylinder 11, the second plate cylinder 12, the first blanket cylinder 13 contactable with the first plate cylinder 11, the second blanket cylinder 14 contactable with the second plate cylinder 12, the first impression cylinder 15 contactable with the first blanket cylinder 13, and the second impression cylinder 16 contactable with the second blanket cylinder 14. The printing machine further includes a paper feed cylinder 17 for transferring printing paper supplied from a paper storage station 31 to the first impression cylinder 15, a transfer cylinder 18 for transferring the printing paper from the first impression cylinder 15 to the second impression cylinder 16, a paper discharge cylinder 19 with chains 23 wound thereon and extending to and wound on sprockets 22 for discharging printed paper from the second impression cylinder 16 to a paper discharge station 32, and an imaging unit 60 for reading the images printed on the printing paper.

Each of the first and second plate cylinders 11 and 12 is what is called a two-segmented cylinder for holding two printing plates peripherally thereof for printing in two different colors. The first and second blanket cylinders 13 and 14 have the same diameter as the first and second plate cylinders 11 and 12, and each has blanket surfaces for transferring images in two colors.

The first and second impression cylinders 15 and 16 movable into contact with the first and second blanket cylinders 13 and 14, respectively, have half the diameter of the first and second plate cylinders 11 and 12 and the first and second blanket cylinders 13 and 14. The first and second impression cylinders 15 and 16 have grippers, not shown, for holding and transporting the forward end of printing paper.

The paper feed cylinder 17 disposed adjacent the impression cylinder 15 has the same diameter as the first and second impression cylinders 15 and 16. The paper feed cylinder 17 has a gripper, not shown, for holding and transporting, with each intermittent rotation of the feed cylinder 17, the forward end of each sheet of printing paper fed from the paper storage station 31. When the printing paper is transferred from the feed cylinder 17 to the first impression cylinder 15, the gripper of the first impression cylinder 15 holds the forward end of the printing paper which has been held by the gripper of the feed cylinder 17.

The transfer cylinder 18 disposed between the first impression cylinder 15 and second impression cylinder 16 has the same diameter as the first and second plate cylinders 11 and 12 and the first and second blanket cylinders 13 and 14. The transfer cylinder 18 has a gripper, not shown, for holding and transporting the forward end of the printing paper received from the first impression cylinder 15, and transferring the forward end of the printing paper to the gripper of the second impression cylinder 16.

Figure 5:
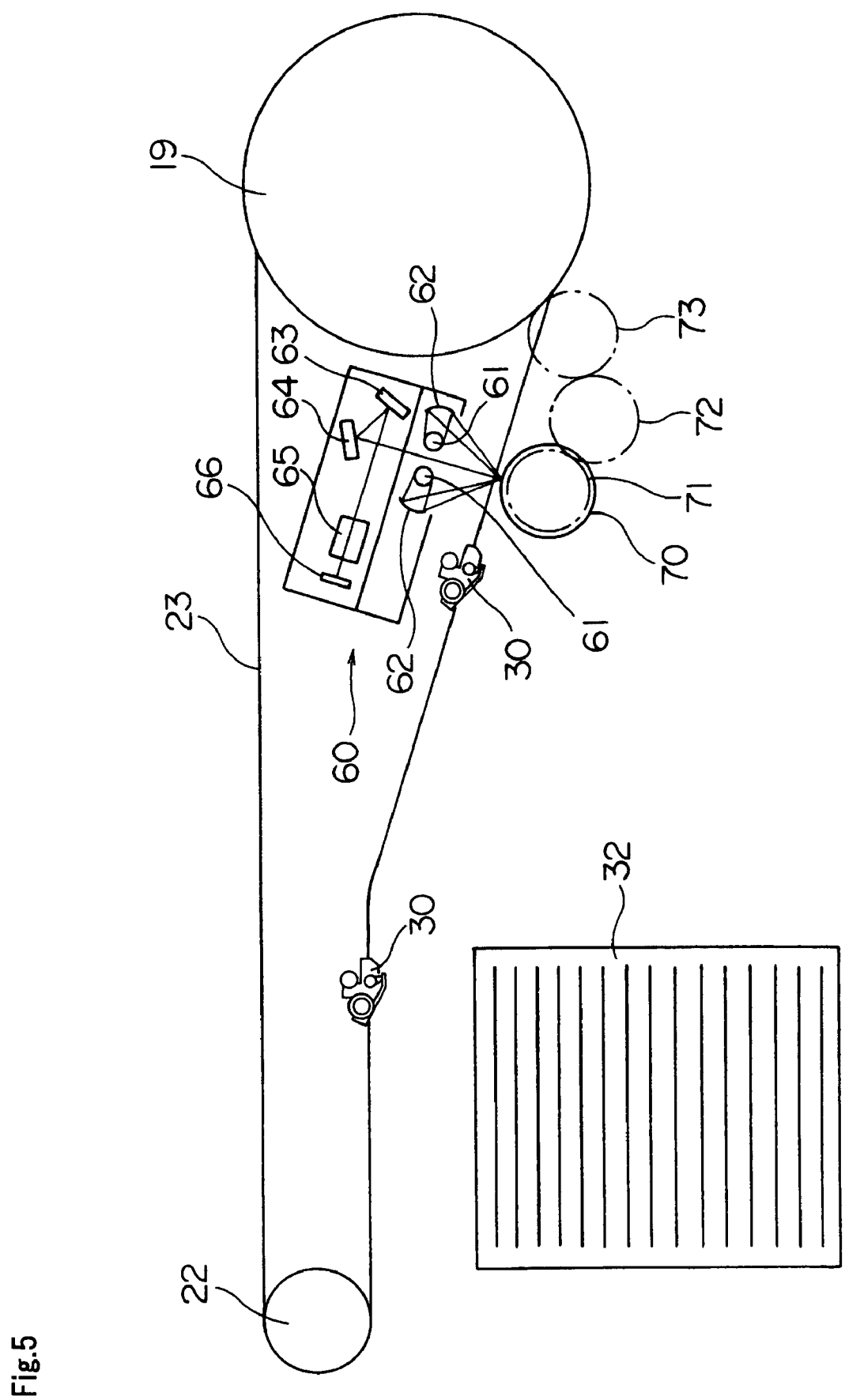
FIG. 5 is a schematic side view showing an imaging unit along with a paper discharge mechanism such as a paper discharge cylinder.

The paper discharge cylinder 19 disposed adjacent the second impression cylinder 16 has the same diameter as the first and second plate cylinders 11 and 12 and the first and second blanket cylinders 13 and 14. The discharge cylinder 19 has a pair of chains 23 wound around opposite ends thereof. The chains 23 are interconnected by coupling members, not shown, having a plurality of grippers 30 arranged thereon (FIG. 5). When the second impression cylinder 16 transfers the printing paper to the discharge cylinder 19, one of the grippers 30 on the discharge cylinder 17 holds the forward end of the printing paper having been held by the gripper of the second impression cylinder 16. With movement of the chains 23, the printing paper is transported to the paper discharge station 32 to be discharged thereon.

The paper feed cylinder 17 has a gear attached to an end thereof and connected to a gear 26 disposed coaxially with a driven pulley 25. A belt 29 is wound around and extends between the driven pulley 25 and a drive pulley 28 rotatable by a motor 27. Thus, the paper feed cylinder 17 is rotatable by drive of the motor 27. The first and second plate cylinders 11 and 12, first and second blanket cylinders 13 and 14, first and second impression cylinders 15 and 16, paper feed cylinder 17, transfer cylinder 18 and paper discharge cylinder 19 are coupled to one another by gears attached to ends thereof, respectively. Thus, by the drive of motor 27, the paper feed cylinder 17, first and second impression cylinders 15 and 16, paper discharge cylinder 19, first and second blanket cylinders 13 and 14, first and second plate cylinders 11 and 12 and transfer cylinder 18 are rotatable synchronously with one another.

The first plate cylinder 11 is surrounded by an ink feeder 20a for feeding an ink of black (K), for example, to a plate, an ink feeder 20b for feeding an ink of cyan (C), for example, to a plate, and dampening water feeders 21a and 21b for feeding dampening water to the plates. The second plate cylinder 12 is surrounded by an ink feeder 20c for feeding an ink of magenta (M), for example, to a plate, an ink feeder 20d for feeding an ink of yellow (Y), for example, to a plate, and dampening water feeders 21c and 21d for feeding dampening water to the plates.

Further, arranged around the first and second plate cylinders 11 and 12 are a plate feeder 33 for feeding plates to the peripheral surface of the first plate cylinder 11, a plate feeder 34 for feeding plates to the peripheral surface of the second plate cylinder 12, an image recorder 35 for recording images on the plates mounted peripherally of the first plate cylinder 11, and an image recorder 36 for recording images on the plates mounted peripherally of the second plate cylinder 12.

Figure 2:
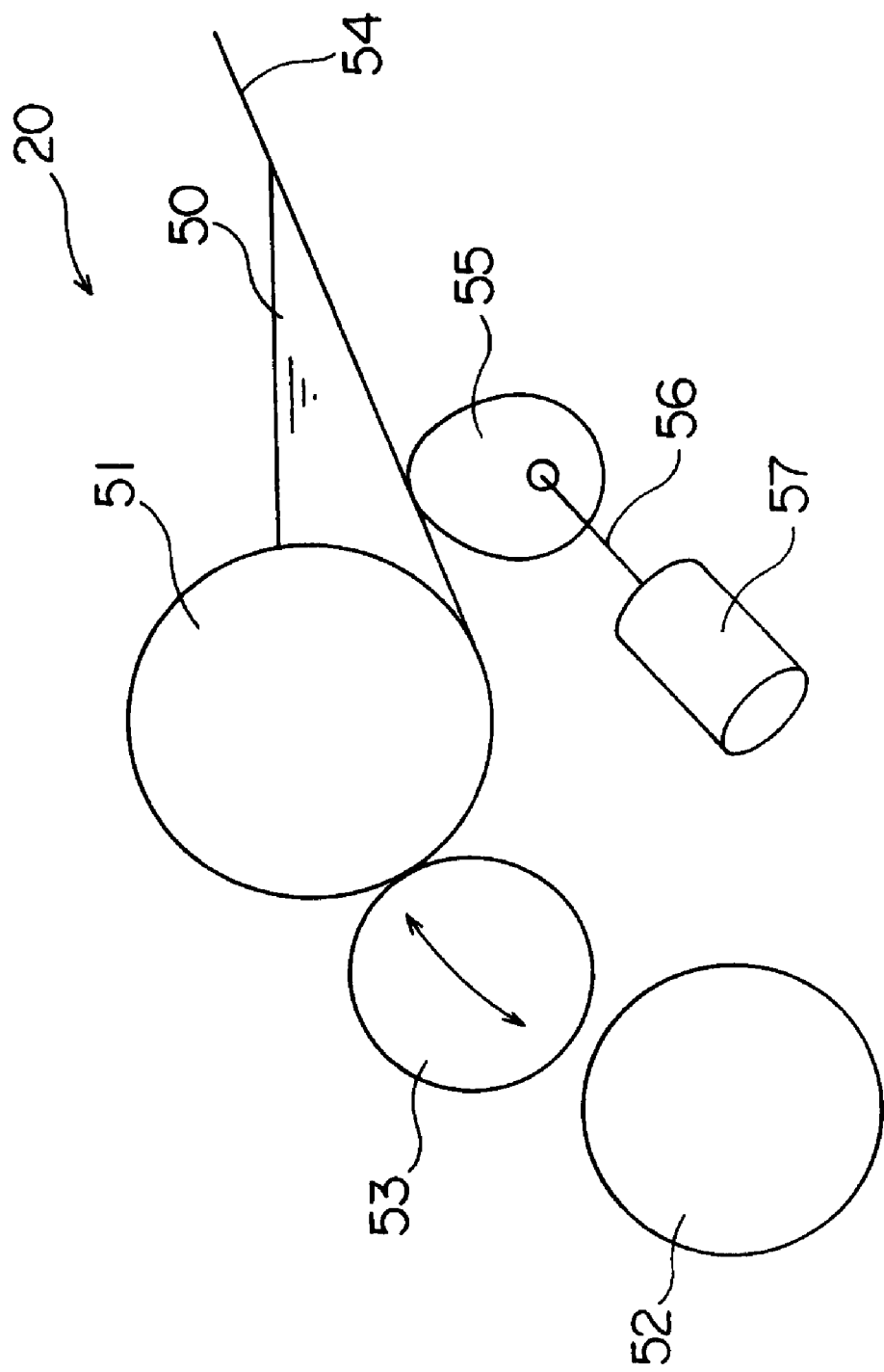
FIG. 2 is a schematic side view of an ink feeder.
Figure 3:
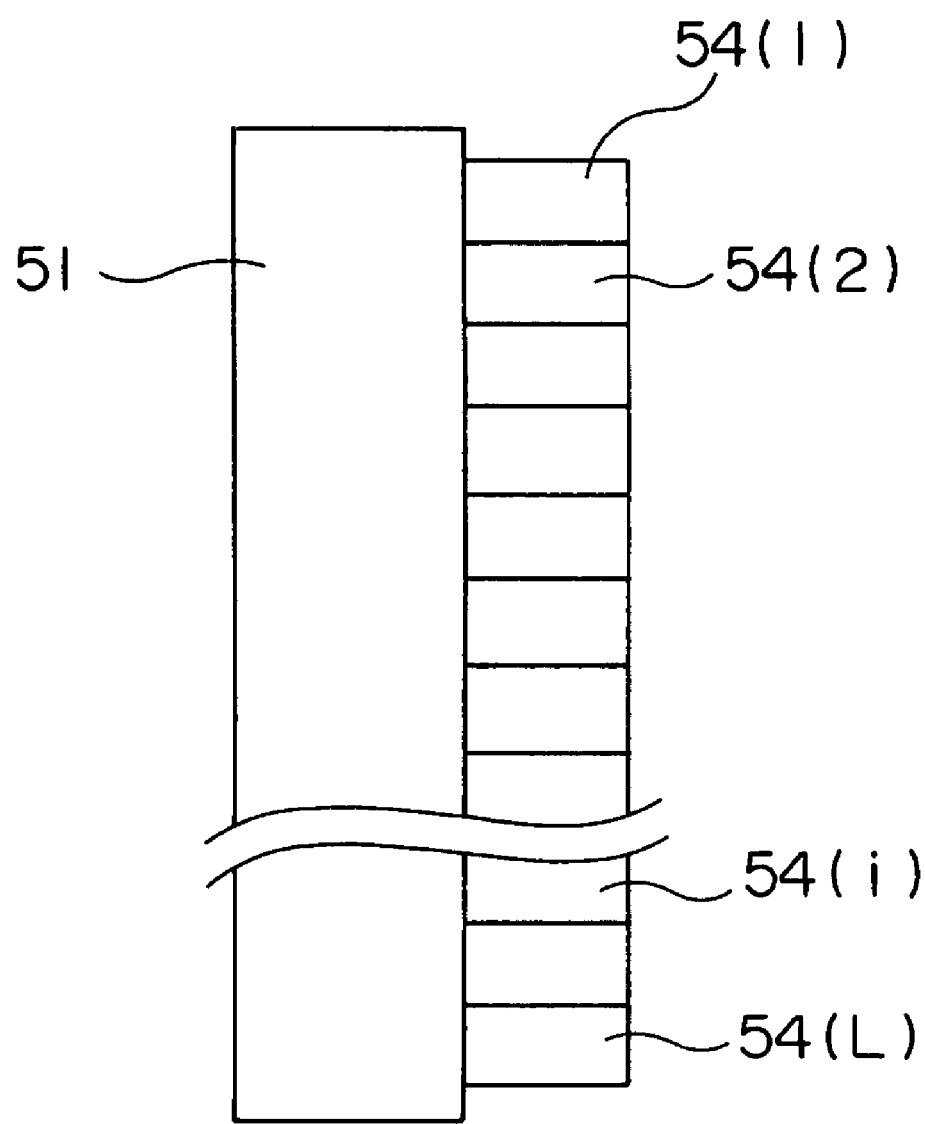
FIG. 3 is a plan view of the ink feeder.

FIG. 2 is a schematic side view showing the ink feeder 20a among the above ink feeders 20a, 20b, 20c and 20d (which may be referred to collectively as "ink feeder 20"). FIG. 3 is a plan view thereof. Ink 50 is omitted from FIG. 3.

The ink feeder 20 includes an ink fountain roller 51 having an axis thereof extending in a direction of width of prints (i.e. perpendicular to a printing direction of the printing machine), and a plurality of ink rollers 52 (only one being shown in FIG. 2), and an ink transfer roller 53 that vibrates between the ink fountain roller 51 and a foremost one of the ink rollers 52. The ink feeder 20 further includes ink keys 54(1), 54(2) . . . 54(L) (which may be referred to collectively as "ink keys 54") arranged in the direction of width of the prints. The ink fountain roller 51 and ink keys 54 define an ink well for storing ink 50.

Eccentric cams 55, L in number, are arranged under the respective ink keys 54 for pressing the ink keys 54 toward the surface of ink fountain roller 51 to vary the opening degree of each ink key 54 with respect to the ink fountain roller 51. The eccentric cams 55 are connected through shafts 56 to pulse motors 57, L in number, for rotating the eccentric cams 55, respectively.

Each pulse motor 57, in response to an ink key drive pulse applied thereto, rotates the eccentric cam 55 about the shaft 56 to vary a pressure applied to the ink key 54. The opening degree of the ink key 54 with respect to the ink fountain roller 51 is thereby varied to vary the rate of ink fed to the printing plate.

Figure 4:
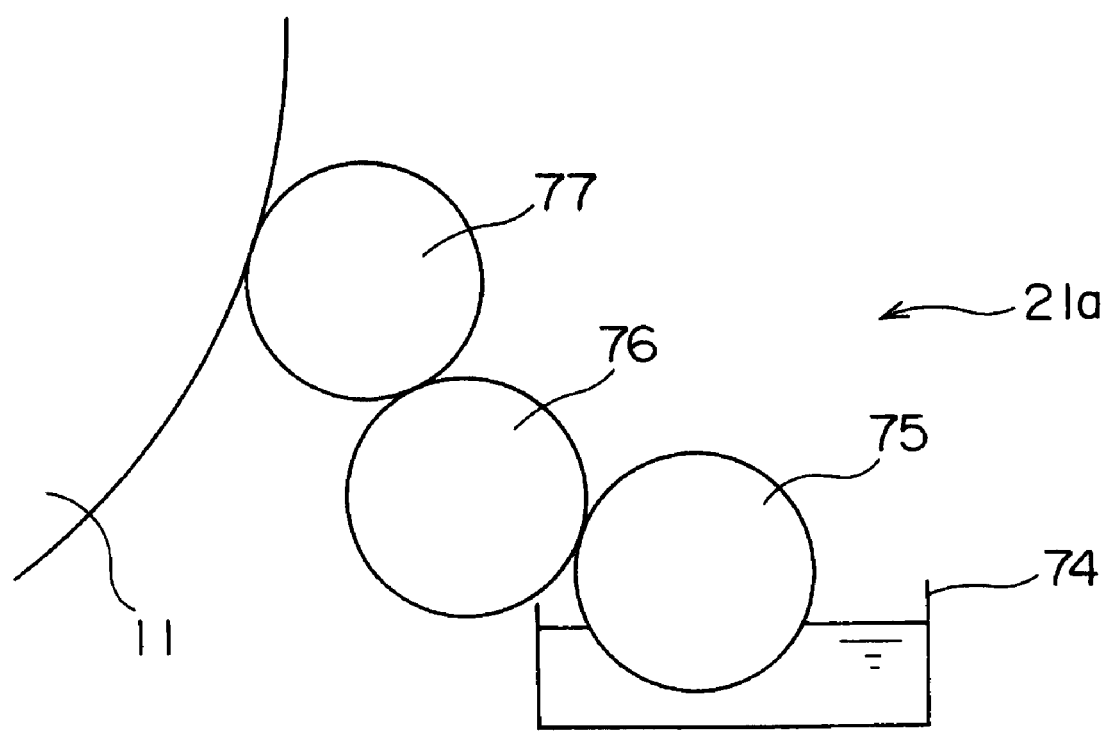
FIG. 4 is a schematic side view of a dampening water feeder.

FIG. 4 is a schematic side view of the dampening water feeder 21a among the above dampening water feeders 21a, 21b, 21c and 21d (which may be referred to collectively as "dampening water feeder 21").

The dampening water feeder 21a includes a water source having a water vessel 74 for storing dampening water and a water fountain roller 75 rotatable by a motor 78, to be described hereinafter, and two water rollers 76 and 77 for transferring the dampening water from the fountain roller 75 to the surface of one of the plates mounted peripherally of the first plate cylinder 11. This dampening water feeder is capable of adjusting the feed rate of dampening water to the surface of the plate by varying the rotating rate of fountain roller 75.

FIG. 5 is a schematic side view showing the imaging unit 60 along with the paper discharge mechanism such as the paper discharge cylinder 19.

The imaging unit 60 is used to read images printed on the printing paper and measure densities of printing control scales.

The pair of chains 23 are endlessly wound around the opposite ends of the paper discharge cylinder 19 and the pair of sprockets 22. As noted hereinbefore, the chains 23 are interconnected by coupling members, not shown, having a plurality of grippers 30 arranged thereon each for gripping the forward end of printing paper transported. FIG. 5 shows only two grippers 30, with the other grippers 30 omitted.

The pair of chains 23 have a length corresponding to a multiple of the circumference of first and second impression cylinders 15 and 16. The grippers 30 are arranged on the chains 23 at intervals each corresponding to the circumference of first and second impression cylinders 15 and 16. Each gripper 30 is opened and closed by a cam mechanism, not shown, synchronously with the gripper on the paper discharge cylinder 19. Thus, each gripper 30 receives the printing paper from the paper discharge cylinder 19, transports the printing paper with rotation of the chains 23, and is then opened by the cam mechanism, not shown, to discharge the paper on the paper discharge station 32.

The printing paper is transported with only the forward end thereof held by one of the grippers 30, the rear end of printing paper not being fixed. Consequently, the printing paper could flap during transport, which impairs an operation, to be described hereinafter, of the imaging unit 60 to read images and measure densities of printing control scales S. To avoid such an inconvenience, this printing machine provides a suction roller 70 disposed upstream of the paper discharge station 32 for stabilizing the printing paper transported.

The suction roller 70 is in the form of a hollow roller having a surface defining minute suction bores, with the hollow interior thereof connected to a vacuum pump not shown. The suction roller 70 has a gear 71 attached to an end thereof. The gear 71 is connected through idler gears 72 and 73 to the gear attached to an end of the paper discharge cylinder 19. Consequently, the suction roller 70 is driven to rotate in a matching relationship with a moving speed of the grippers 30. Thus, the printing paper is sucked to the surface of the suction roller 70, thereby being held against flapping when passing over the suction roller 70. In place of the suction roller 70, a suction plate may be used to suck the printing paper two-dimensionally.

The above imaging unit 60 includes a pair of linear light sources 61 extending parallel to the suction roller 70 for illuminating the printing paper on the suction roller 70, a pair of condensing plates 62, reflecting mirrors 63 and 64, a condensing lens 65 and a CCD line sensor 66. The printing paper transported by the paper discharge mechanism including the paper discharge cylinder 19 and chains 23 are illuminated by the pair of linear light sources 61, and photographed by the CCD line sensor 66.

Figure 6:
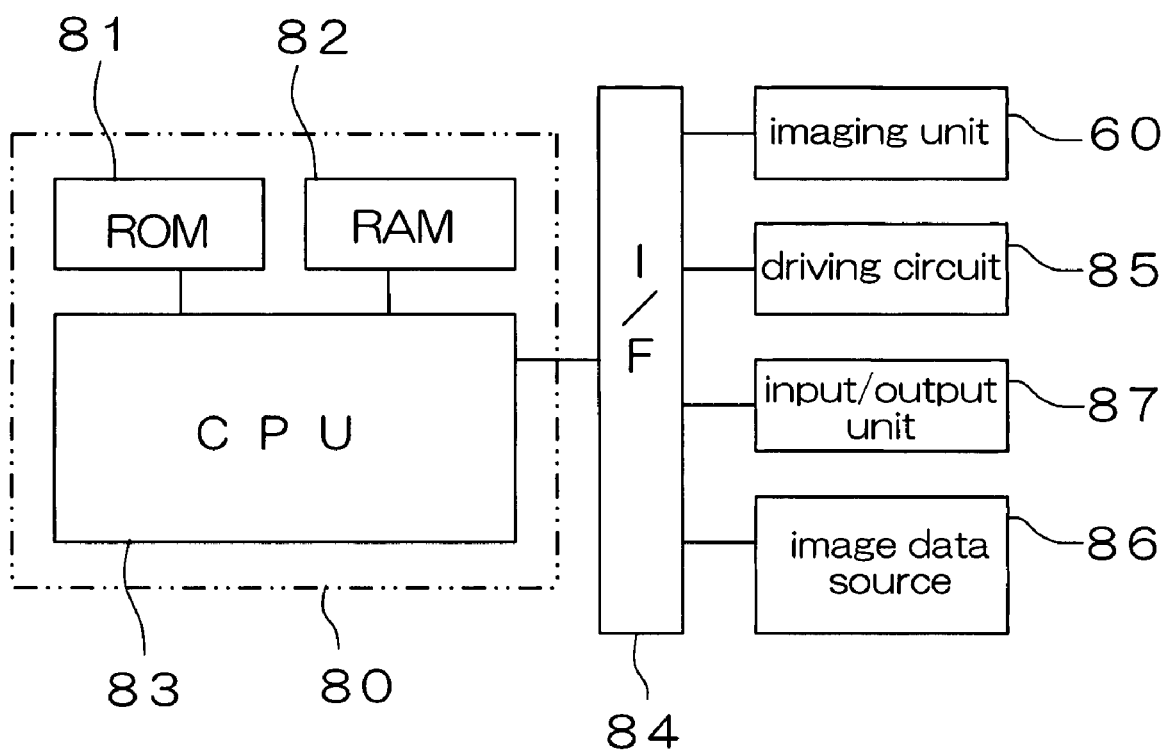
FIG. 6 is a block diagram of a principal electrical structure of the printing machine.

FIG. 6 is a block diagram showing a principal electrical structure of the printing machine.

This printing machine includes a control unit 80 having a ROM 81 for storing operating programs necessary for controlling the machine, a RAM 82 for temporarily storing data and the like during a control operation, and a CPU 83 for performing logic operations. The control unit 80 is connected to the above imaging unit 60 through an interface 84. Further, the control unit 80 is connected through the interface 84 to a driving circuit 85 for generating driving signals for driving the ink feeders 20, dampening water feeders 21, image recorders 35 and 36 and so on. The control unit 80 is connected also to an input/output unit 87 having a control panel of the touch panel type using liquid crystal to be capable of inputting data and displaying images. The control unit 80 is connected, through the interface 84, also to an image data source 86 storing the data of images for use in platemaking and printing.

The printing machine is controlled by this control unit 80 to execute a prepress operation, a printing operation including ink and dampening water feeding, and a representative point determining operation according to this invention, as described hereinafter.

The control unit 80 acts as a representative point setting device for setting a representative point for use in controlling a color tone based on image data described hereinafter, a checking device for checking whether the representative point set by the representative point setting device is appropriate for tone measurement, and an alternative representative point setting device for setting an alternative representative point based on a priority condition set beforehand when a point inappropriate for tone measurement has been selected as the representative point.

In the printing machine having the above construction, a printing plate stock drawn from a supply cassette 41 of the plate feeder 33 is cut to a predetermined size by a cutter 42. The forward end of each plate in cut sheet form is guided by guide rollers and guide members, not shown, and is clamped by clamps of the first plate cylinder 11. Then, the first plate cylinder 11 is driven by a motor, not shown, to rotate at low speed, whereby the plate is wrapped around the peripheral surface of the first plate cylinder 11. The rear end of the plate is clamped by other clamps of the first plate cylinder 11. While, in this state, the first plate cylinder 11 is rotated at high speed, the image recorder 35 irradiates the surface of the plate mounted peripherally of the first plate cylinder 11 with a laser beam modulated according to image data for recording an image thereon.

Similarly, a printing plate stock drawn from a supply cassette 43 of the plate feeder 34 is cut to the predetermined size by a cutter 44. The forward end of each plate in cut sheet form is guided by guide rollers and guide members, not shown, and is clamped by clamps of the second plate cylinder 12. Then, the second plate cylinder 12 is driven by a motor, not shown, to rotate at low speed, whereby the plate is wrapped around the peripheral surface of the second plate cylinder 12. The rear end of the plate is clamped by other clamps of the second plate cylinder 12. While, in this state, the second plate cylinder 12 is rotated at high speed, the image recorder 36 irradiates the surface of the plate mounted peripherally of the second plate cylinder 12 with a laser beam modulated according to image data for recording an image thereon.

The first plate cylinder 11 has, mounted peripherally thereof, a plate for printing in black ink and a plate for printing in cyan ink. The two plates are arranged in evenly separated positions (i.e. in positions separated from each other by 180 degrees). The image recorder 35 records images on these plates. Similarly, the second plate cylinder 12 has, mounted peripherally thereof, a plate for printing in magenta ink and a plate for printing in yellow ink. The two plates also are arranged in evenly separated positions, and the image recorder 36 records images on these plates, to complete a prepress process.

The prepress process is followed by a printing process for printing the printing paper with the plates mounted on the first and second plate cylinders 11 and 12. This printing process is carried out as follows.

First, each dampening water feeder 21 and each ink feeder 20 are placed in contact with only a corresponding one of the plates mounted on the first and second plate cylinders 11 and 12. Consequently, dampening water and inks are fed to the plates from the corresponding water feeders 21 and ink feeders 20, respectively. These inks are transferred from the plates to the corresponding regions of the first and second blanket cylinders 13 and 14, respectively.

Then, the printing paper is fed to the paper feed cylinder 17. The printing paper is subsequently passed from the paper feed cylinder 17 to the first impression cylinder 15. The impression cylinder 15 having received the printing paper continues to rotate. Since the first impression cylinder 15 has half the diameter of the first plate cylinder 11 and the first blanket cylinder 13, the black ink is transferred to the printing paper wrapped around the first impression cylinder 15 in its first rotation, and the cyan ink in its second rotation.

After the first impression cylinder 15 makes two rotations, the printing paper is passed from the first impression cylinder 15 to the second impression cylinder 16 through the transfer cylinder 18. The second impression cylinder 16 having received the printing paper continues to rotate. Since the second impression cylinder 16 has half the diameter of the second plate cylinder 12 and the second blanket cylinder 14, the magenta ink is transferred to the printing paper wrapped around the second impression cylinder 16 in its first rotation, and the yellow ink in its second rotation.

The forward end of the printing paper printed in the four colors in this way is passed from the second impression cylinder 16 to the paper discharge cylinder 19. The printing paper is transported by the pair of chains 23 toward the paper discharge station 32 to be discharged thereon. At this time, the detecting patches on the printing paper being transported are illuminated by the pair of linear light sources 61, and are photographed by the CCD line sensor 66 of the imaging unit 60.

In the printing process, the image printed on the printing paper is measured by the CCD line sensor 66 of the imaging unit 60. The ink feed rates are controlled based on color values at a representative point on the image to adjust a color tone.

After the printing process, the printing paper printed is discharged. The first and second blanket cylinders 13 and 14 are cleaned by a blanket cylinder cleaning device, not shown, to complete the printing process.

Figure 7:
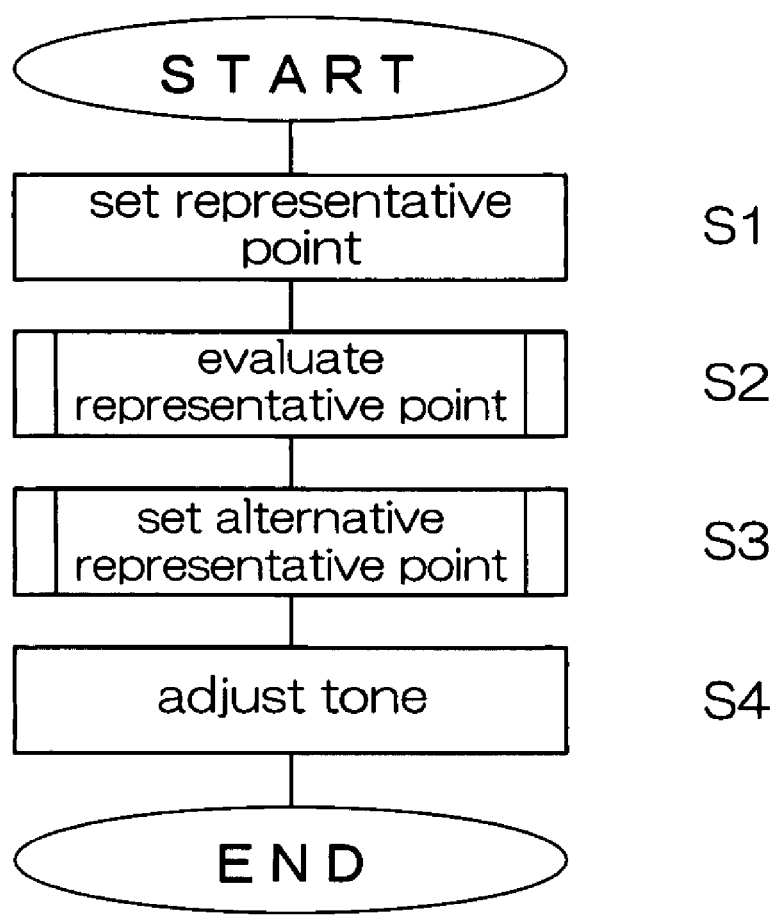
FIG. 7 is a flow chart of a tone control operation according to this invention.

Operations for setting a representative point and controlling a color tone according to this invention will be described next. FIG. 7 is a flow chart showing a tone control operation according to this invention.

In order to execute color tone control, a representative point is first set for use in the color tone control (step S1). This representative point is a point having a color that characterizes a picture on a print, which is set beforehand by the operator. The representative point may be determined automatically as described in Japanese Unexamined Patent Publication No. 2004-50609 or No. 2004-351814.

Next, propriety of the representative point set beforehand is evaluated (step S2). Although the representative point set in the above representative point setting step has a color that characterizes the picture on the print, this point is not necessarily suitable for color measurement. In time of color measurement by the CCD line sensor 66 of the imaging unit 60 described hereinbefore, the inks of YMCK are measured by RGB. It is therefore difficult to separate accurately the colors of a point including black ink. It is also difficult to effect accurate color measurement, depending on an overlap of a plurality of colors and a dot percentage. Accurate tone control is difficult in such a case.

A checking is made, therefore, whether the representative point set beforehand is suitable for color measurement. This representative point checking step will be described in detail hereinafter.

Next, when the representative point set beforehand is found unsuitable for color measurement, an alternative representative point suitable for color measurement is set (step S3). This alternative representative point setting step will also be described in detail hereinafter.

Color tone control is executed by using the alternative representative point set in the alternative representative point setting step (step S4). In this case, the imaging unit 60 reads a print made by the printing machine, and provides image data. Based on data of the alternative representative point included in the image data, the color tone of the print is controlled by controlling the ink feeders 20 and dampening water feeders 21.

When the representative point set beforehand in the representative point setting step is found suitable for color measurement, or when no appropriate alternative representative point is found, the representative point set beforehand in the representative point setting step is used instead of using an alternative representative point.

Figure 8:
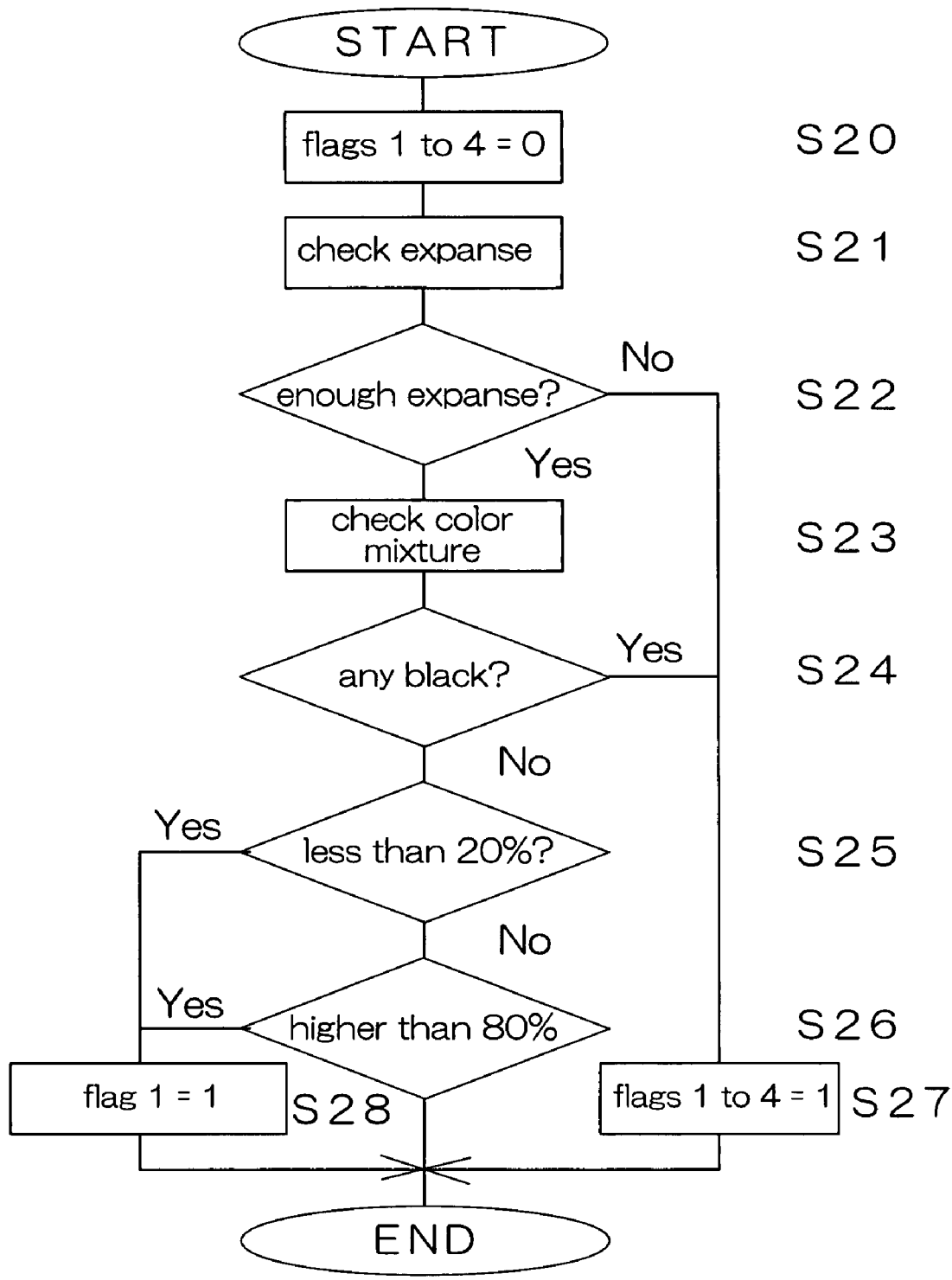
FIG. 8 is a flow chart of a representative point checking process.

Next, the above representative point checking step (step S2) will be described. FIG. 8 is a flow chart showing the representative point checking step.

In the representative point checking step for checking whether the representative point set beforehand is suitable for color measurement, 0 is first set to flags 1-4 (step S20). Flag 1 is a flag for all the colors of yellow, magenta, cyan and black. Flag 2 corresponds to yellow, flag 3 to magenta, and flag 4 to cyan.

Next, a spread of the representative point is checked (step S21). Specifically, a checking is made with respect to each color whether a region with the same or approximately the same dot percentage as the representative point spreads around the representative point across a certain fixed or larger area. This is checked because, when such a region does not have the fixed area, proper measurement can be impossible. This area can be about 5 mm×5 mm according to the resolution and registering precision of the imaging unit 60. When the area of the region is not large enough (step S22), flag 1 is set to 1 (step S27) and the operation is ended. When flag 1 is set to 1, an alternative representative point will be set for all the colors of yellow, magenta, cyan and black as describe hereinafter.

Next, a color mixture is checked (step S23). The color mixture checking is carried out to determine whether the color of black is included, and whether halftone dots of a predetermined dot percentage are included in the representative point.

When this color mixture checking first finds that the representative point has a color mixture that includes the color of black (step S24), flag 1 is set to 1 (step S27) and the operation is ended. That is, since the inks of YMCK are measured by RGB in time of color measurement by the imaging unit 60, an accurate color separation is difficult for a point including the black ink. In the case of such a representative point, therefore, flag 1 is set to 1 (step S27), and the alternative representative point setting step (step S3) is carried out for all the colors afterward.

Next, when the color mixture includes any color of yellow, magenta and cyan whose dot percentage is less than 20% (step S25), the flag corresponding to that color among flags 2-4 is set to 1 (step S28), and the alternative representative point setting step (step S3) is carried out afterward. When any color has a dot percentage exceeding 80% (step S26) also, the flag corresponding to that color among flags 2-4 is set to 1 (step S28), and the alternative representative point setting step (step S3) is carried out afterward.

That is, depending on an overlap and dot percentages of a plurality of colors, an accurate color measurement can be difficult. In the case of such a control point, a flag of the corresponding color is set and the alternative representative point setting step (step S3) is carried out afterward. The above dot percentages of 20% and 80% have been derived from experiment.

FIGS. 9A through 11B are tables showing measurement errors in time of two color inks applied one over the other. In these tables, white circles mark measurement errors (absolute values of differences in density between the colors measured) smaller than 0.05, black triangles errors from 0.05 to 0.1, and x (cross) errors larger than 0.1. When, for example, a difference in density between any two colors applied one over the other exceeds 0.1, this point is considered unsuitable and marked with x.

FIGS. 9A and 9B show measurement errors in time of printing with the cyan and magenta inks. Dot percentage was successively changed for cyan to 4%, 16%, 35%, 53%, 76%, 90% and 100%, and for magenta to 4%, 16%, 34%, 54%, 76%, 92% and 100%. FIG. 9A shows the measurement errors of cyan, and FIG. 9B those of magenta.

FIGS. 10A and 10B show measurement errors in time of printing with the cyan and yellow inks. Dot percentage was successively changed for cyan to 4%, 16%, 35%, 53%, 76%, 90% and 100%, and for yellow to 10%, 35%, 64% and 100%. FIG. 10A shows the measurement errors of cyan, and FIG. 10B those of yellow.

FIGS. 11A and 11B show measurement errors in time of printing with the magenta and yellow inks. Dot percentage was successively changed for magenta to 10%, 35%, 64% and 100%, and for yellow to 4%, 16%, 35%, 53%, 76%, 90% and 100%. FIG. 11A shows the measurement errors of magenta, and FIG. 11B those of yellow.

FIGS. 12A through 18C are tables showing measurement errors in time of the three color inks applied one over another. In these tables also, white circles mark measurement errors smaller than 0.05, black triangles errors from 0.05 to 0.1, and x errors larger than 0.1.

FIGS. 12A through 18C show measurement errors in time of printing with dot percentage successively changed for yellow to 10%, 35%, 64% and 100%, and for magenta to 4%, 16%, 34%, 54%, 76%, 92% and 100%. Among these figures, FIGS. 12A, 12B and 12C show a case of the dot percentage of cyan at 4%, FIGS. 13A, 13B and 13C a case of the dot percentage of cyan at 16%, FIGS. 14A, 14B and 14C a case of the dot percentage of cyan at 35%, FIGS. 15A, 15B and 15C a case of the dot percentage of cyan at 53%, FIGS. 16A, 16B and 16C a case of the dot percentage of cyan at 76%, FIGS. 17A, 17B and 17C a case of the dot percentage of cyan at 90%, and FIGS. 18A, 18B and 18C a case of the dot percentage of cyan at 100%. FIGS. 12A, 13A, 14A, 15A, 16A, 17A and 18A show measurement errors of cyan. FIGS. 12B, 13B, 14B, 15B, 16B, 17B and 18B show measurement errors of magenta. FIGS. 12C, 13C, 14C, 15C, 16C, 17C and 18C show measurement errors of yellow.

As seen from these tables, a color mixture having a dot percentage between 20% and 80% can make measurement errors small. Conversely, when the color mixture has a dot percentage less than 20% or exceeding 80%, the density measurement of the color concerned tends to produce large measurement errors.

Figure 19:
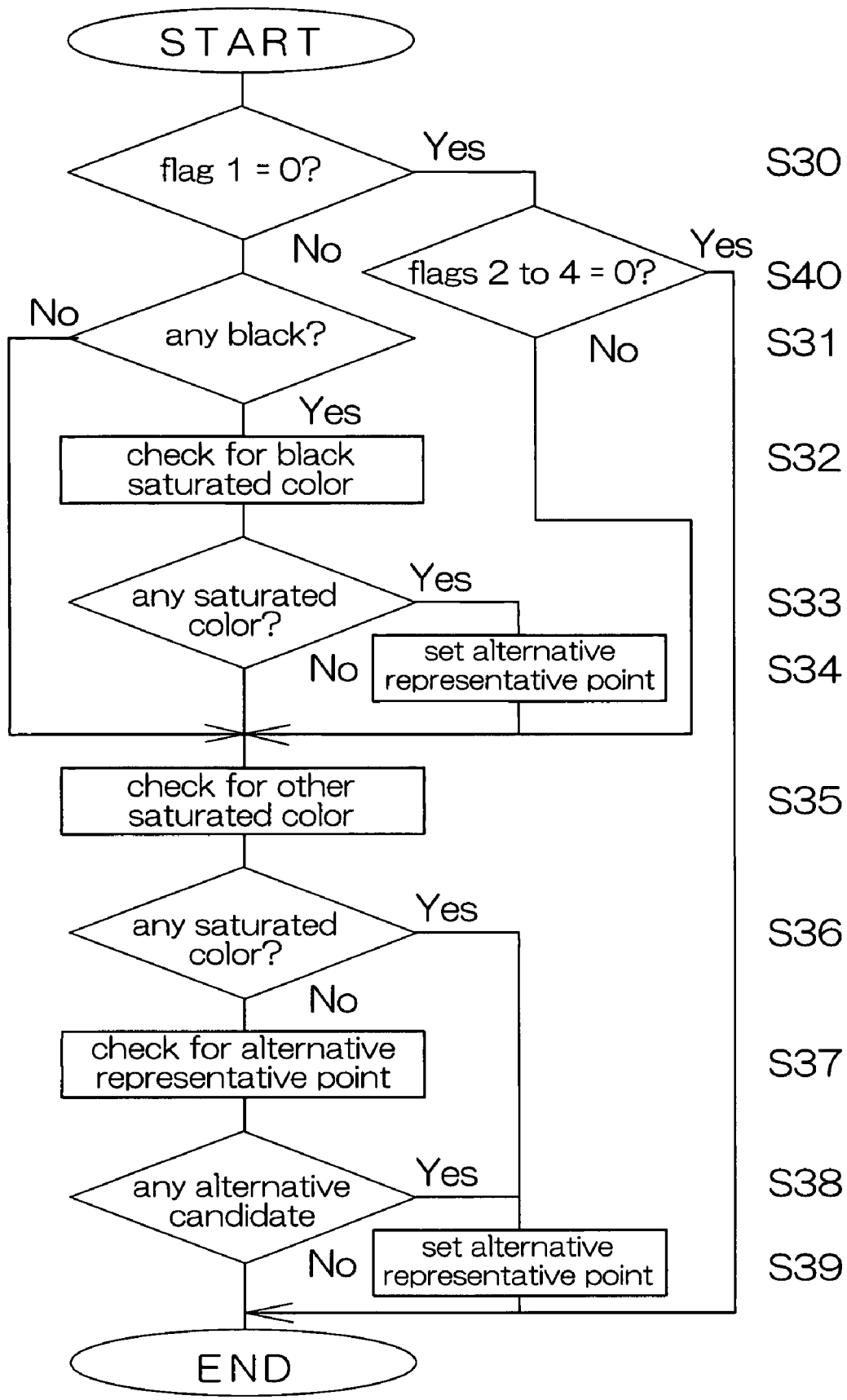
FIG. 19 is a flow chart of an alternative representative point setting process.

Next, the alternative representative point setting step (step S3) noted hereinbefore will be described. FIG. 19 is a flow chart of the alternative representative point setting step.

First, a checking is made whether flag 1 is 0 (step S30). When flag 1 is 0, a checking is made next whether flag 2, flag 3 and flag 4 are 0 (step S40). When flag 2, flag 3 and flag 4 are 0, it is determined that an alternative representative point need not be set, and the operation is ended. In this case, the representative point set in the representative point setting step (step S1) is used for color tone adjustment (step S4). On the other hand, when flag 2, flag 3 or flag 4 is 1, the operation proceeds to a saturated color checking step (step S35) described hereinafter, for the color concerned. It should be noted that steps S35 through S39 are executed separately for each color of yellow, magenta and cyan.

When flag 1 is not 0 (i.e. when flag 1 is 1), a checking is made whether the representative point has a color mixture including the color of black (step S31). When the representative point has a color mixture not including the color of black, the operation proceeds to a next step. When the representative point has a color mixture including the color of black, the operation searches for a point of black saturated color (i.e. a point with only the color of black) (step S32).

Figure 20:
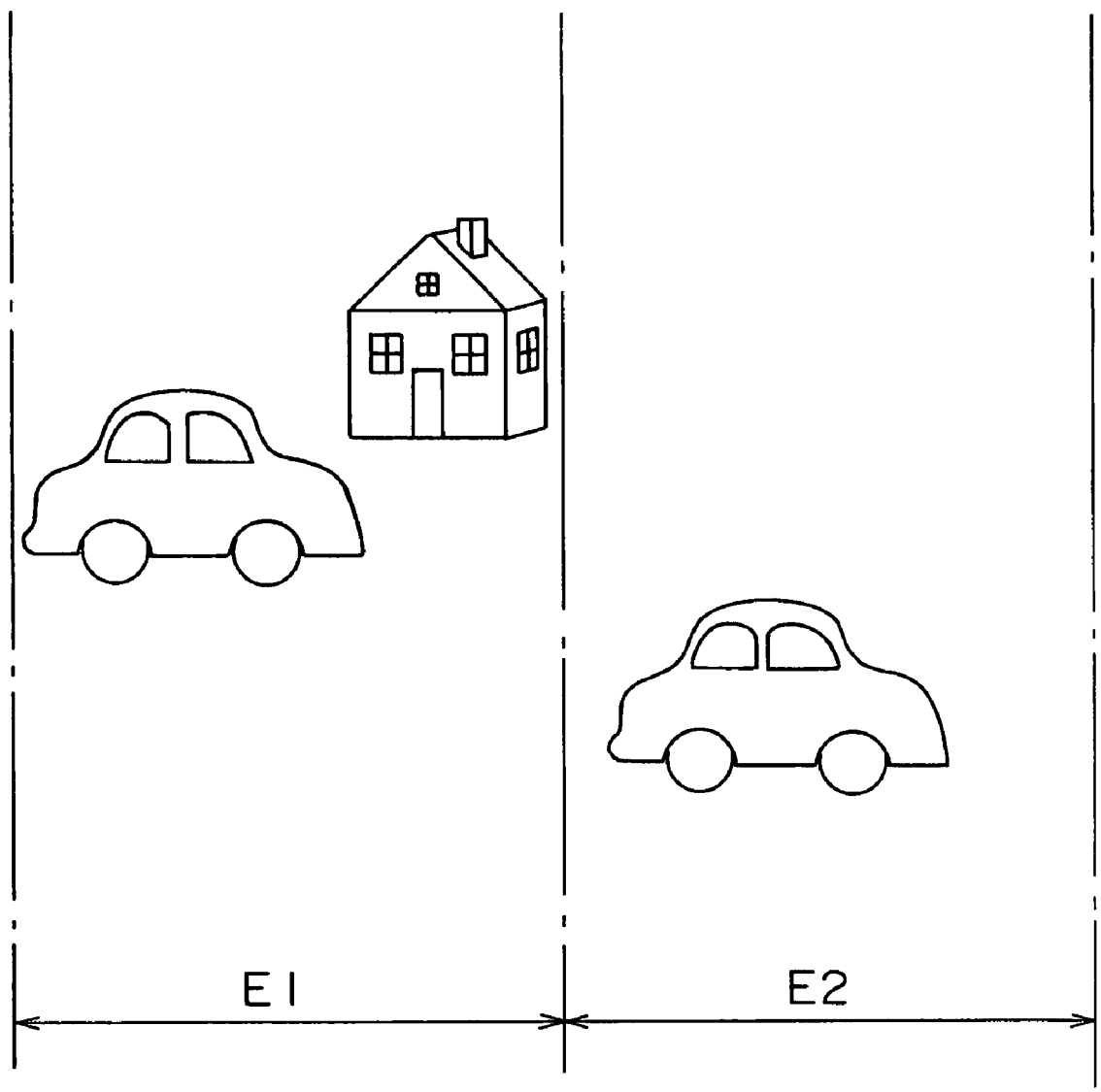
FIG. 20 is a schematic view showing part of an image displayed on an input/output unit.

FIG. 20 is a schematic view showing part of an image displayed on the input/output unit 87 in the form of a control panel. In this figure, E1 and E2 indicate areas corresponding to the ink keys 54(1) and 54(2) shown in FIG. 3.

It is assumed that a window portion of the house of the image shown in FIG. 20, for example, is set as the representative point, and that this representative point has a color mixture including the color of black. In this case, a search is made for a point of the saturated color of black having a similar dot percentage to this representative point, lying close to the representative point, and having a certain fixed or larger area. Having the certain fixed or larger area is an essential requirement. Which of the closeness in dot percentage and the closeness in distance should be given priority is determined from the characteristics of the printing machine. However, it is necessary to find a point of the saturated color of black in the same ink key area E1.

A search for a point of saturated color may be made as described in Japanese Unexamined Patent Publication No. 2004-351814, for example. That is, a list of colors is created, the colors are evaluated successively, and a point with the highest evaluation is selected.

When such a point of saturated color has been found (step S33), this point is set as an alternative representative point of the color of black (step S34). Consequently, the feed rate of the black ink is controlled based on the density of black in this alternative representative point.

Next, a search is made for a point of saturated color of each of yellow, magenta and cyan (step S35). As noted hereinbefore, the subsequent steps are executed separately for each of yellow, magenta and cyan designated by the flag.

In this case, as in the case of black, a search is made for a point of saturated color having a similar dot percentage to the representative point, lying close to the representative point, and having the certain fixed or larger area. In this case also, having the certain fixed or larger area is an essential requirement, and which of the closeness in dot percentage and the closeness in distance should be given priority is determined from the characteristics of the printing machine. It is also necessary to find a point of saturated color in the same ink key area E1.

A search for this point of saturated color may also be made as described in Japanese Unexamined Patent Publication No. 2004-351814. That is, a list of colors is created, the colors are evaluated successively, and a point with the highest evaluation is selected.

When such a point of saturated color has been found (step S36), this point is set as an alternative representative point of that color (step S39). Consequently, the feed rate of that color ink is controlled based on the density of that color in this alternative representative point.

On the other hand, when no such point of saturated color has been found (step S36), a search is made for a different alternative representative point (step S37). This alternative representative point is selected from among points not including the color of black. In this case, besides the conditions of having a similar dot percentage to the representative point, lying close to the representative point, and having the certain fixed or larger area, a condition is added that any color concerned should have a dot percentage between 20% and 80% inclusive.

In this case also, having the certain fixed or larger area is an essential requirement. The condition that any color concerned should have a dot percentage between 20% and 80% is given priority over the closeness in dot percentage and the closeness in distance. Which of the closeness in dot percentage and the closeness in distance should be given priority is determined from the characteristics of the printing machine. In this case also, it is necessary to find an alternative representative point in the same ink key area E1.

A search for this alternative representative point may also be made as described in Japanese Unexamined Patent Publication No. 2004-351814. That is, a list of colors is created, the colors are evaluated successively, and a point with the highest evaluation is selected.

When a candidate for the alternative representative point has been found (step S38), this point is set as an alternative representative point of the color (step S39) and the process is ended. When no candidate for the alternative representative point has been found (step S38), the process is ended in that state. In this case, the representative point set in the representative point setting step (step S1) is used for color tone adjustment (step S4) for that color. It is possible that a proper alternative representative point is not obtained for any given color. In such a case, the original representative point is used instead of an alternative representative point.

The foregoing embodiment has been described in relation to printing in the four colors of yellow, magenta, cyan and black. However, this invention is equally applicable to printing other than the four-color printing.

This invention may be embodied in other specific forms without departing from the spirit or essential attributes thereof and, accordingly, reference should be made to the appended claims, rather than to the foregoing specification, as indicating the scope of the invention.

This application claims priority benefit under 35 U.S.C. Section 119 of Japanese Patent Application No. 2006-063804 filed in the Japanese Patent Office on Mar. 9, 2006, the entire disclosure of which is incorporated herein by reference.

What is claimed is:

1. A printed tone control method for adjusting a printed color tone by comparing image data serving as a reference and image data obtained by reading an image from a print actually made by a printing machine, said method comprising;

a representative point setting step performed by a device for setting a representative point for use in control of the color tone based on image data;

an alternative representative point setting step for setting an alternative representative point that satisfies a predetermined condition when a point inappropriate for tone measurement is selected as said representative point; and a tone adjusting step for adjusting the color tone by using said alternative representative point.

2. A printed tone control method as defined in claim 1, wherein said alternative representative point setting step is executed to set said alternative representative point selected with priority from blackless points present in an identical ink key area.

3. A printed tone control method as defined in claim 2, wherein said alternative representative point is selected with priority from monochromatically printed points present in the identical ink key area.

4. A printed tone control method as defined in claim 2, wherein said alternative representative point is selected with priority from points present in the identical ink key area and having a dot percentage, for a color to be controlled, between 20% and 80% inclusive.

5. A printed tone control method as defined in claim 2, wherein said alternative representative point is selected with priority from points present in the identical ink key area and having a dot percentage close to that of said representative point.

6. A printed tone control method as defined in claim 2, wherein said alternative representative point is selected with priority from points present in the identical ink key area and at short distances to said representative point.

7. A printed tone control method as defined in claim 1, wherein said alternative representative point setting step is executed to set said alternative representative point selected with first priority from blackless points, with second priority from monochromatically printed points, and with third priority from points having a dot percentage, for a color to be controlled, between 20% and 80% inclusive, all said points being present in an identical ink key area.

8. A representative point determining apparatus for setting a representative point for use in printed tone control for adjusting a printed color tone by comparing image data serving as a reference and image data obtained by reading an image from a print actually made by a printing machine, said apparatus comprising;

a representative point setting device for setting a representative point for use in control of the color tone based on image data;

a checking device for checking whether the representative point set by said representative point setting device is appropriate for the control of the color tone; and an alternative representative point setting device for setting an alternative representative point based on predetermined priority conditions when a point inappropriate for tone measurement is selected as said representative point.

9. A representative point determining apparatus as defined in claim 8, wherein said priority conditions give a first priority to blackless points, a second priority to monochromatically printed points, and a third priority to points having a dot percentage, for a color to be controlled, between 20% and 80% inclusive, all said points being present in an identical ink key area.

* * * * *